US012350936B2

(12) United States Patent
Fujita et al.

(10) Patent No.: US 12,350,936 B2
(45) Date of Patent: Jul. 8, 2025

(54) LIQUID DISCHARGE HEAD AND LIQUID DISCHARGE APPARATUS

(71) Applicants: Akihiro Fujita, Kanagawa (JP); Ryohta Matsufuji, Kanagawa (JP)

(72) Inventors: Akihiro Fujita, Kanagawa (JP); Ryohta Matsufuji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 176 days.

(21) Appl. No.: 18/121,615

(22) Filed: Mar. 15, 2023

(65) Prior Publication Data

US 2023/0302799 A1 Sep. 28, 2023

(30) Foreign Application Priority Data

Mar. 23, 2022 (JP) ................................ 2022-047023

(51) Int. Cl.

| | |
|---|---|
| ***B41J 2/14*** | (2006.01) |
| ***B41J 2/155*** | (2006.01) |
| ***B41J 2/175*** | (2006.01) |
| ***B41J 29/02*** | (2006.01) |

(52) U.S. Cl.

CPC ............. *B41J 2/1433* (2013.01); *B41J 2/155* (2013.01); *B41J 2/17523* (2013.01); *B41J 29/02* (2013.01); *B41J 2202/05* (2013.01)

(58) Field of Classification Search

CPC ...... B41J 2/1433; B41J 2/17523; B41J 29/02; B41J 2202/05; B41J 2/14201; B41J 2/15; B41J 2202/12

See application file for complete search history.

(56) References Cited

U.S. PATENT DOCUMENTS

| | | | | |
|---|---|---|---|---|
| 2013/0215188 | A1* | 8/2013 | Nishimura | B41J 2/14233 347/29 |
| 2020/0039217 | A1 | 2/2020 | Kaiba et al. | |
| 2020/0246814 | A1 | 8/2020 | Fritz et al. | |
| 2020/0298254 | A1 | 9/2020 | Fritz et al. | |
| 2022/0184967 | A1 | 6/2022 | Hiraga | |

FOREIGN PATENT DOCUMENTS

| | | |
|---|---|---|
| JP | 2020-023177 | 2/2020 |
| JP | 2022-094924 | 6/2022 |

* cited by examiner

*Primary Examiner* — Thinh H Nguyen
(74) *Attorney, Agent, or Firm* — XSENSUS LLP

(57) ABSTRACT

A liquid discharge head includes: a nozzle plate having multiple nozzles from each of which a liquid is to be discharged; a housing supporting a peripheral edge of the nozzle plate; a liquid channel between the nozzle plate and the housing; and a coupling portion coupling an inner region of the peripheral edge of the nozzle plate and the housing.

12 Claims, 9 Drawing Sheets

LIQUID DISCHARGE HEAD AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-047023, filed on Mar. 23, 2022, in the Japan Patent Office, the entire disclosure of which is hereby incorporated by reference herein.

BACKGROUND

Technical Field

The present embodiment relates to a liquid discharge head and a liquid discharge apparatus.

Related Art

A liquid discharge apparatus opens and closes a fine nozzle on a nozzle plate with a valve body at a leading end of a needle valve to discharge a high-pressure liquid as liquid from a nozzle. A rear end of the needle valve is coupled to a drive body (actuator) such as a piezoelectric element. Such liquid discharge apparatus is used in various fields. For example, the liquid discharge apparatus is used to draw a figure or the like on a vehicle body of an automobile with high image quality or to discharge a liquid resist or a deoxyribonucleic acid (DNA) sample as a liquid.

SUMMARY

According to an aspect of the present disclosure, a liquid discharge head includes: a nozzle plate having multiple nozzles from each of which a liquid is to be discharged; a housing supporting a peripheral edge of the nozzle plate; a liquid channel between the nozzle plate and the housing; and a coupling portion coupling an inner region of the peripheral edge of the nozzle plate and the housing.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
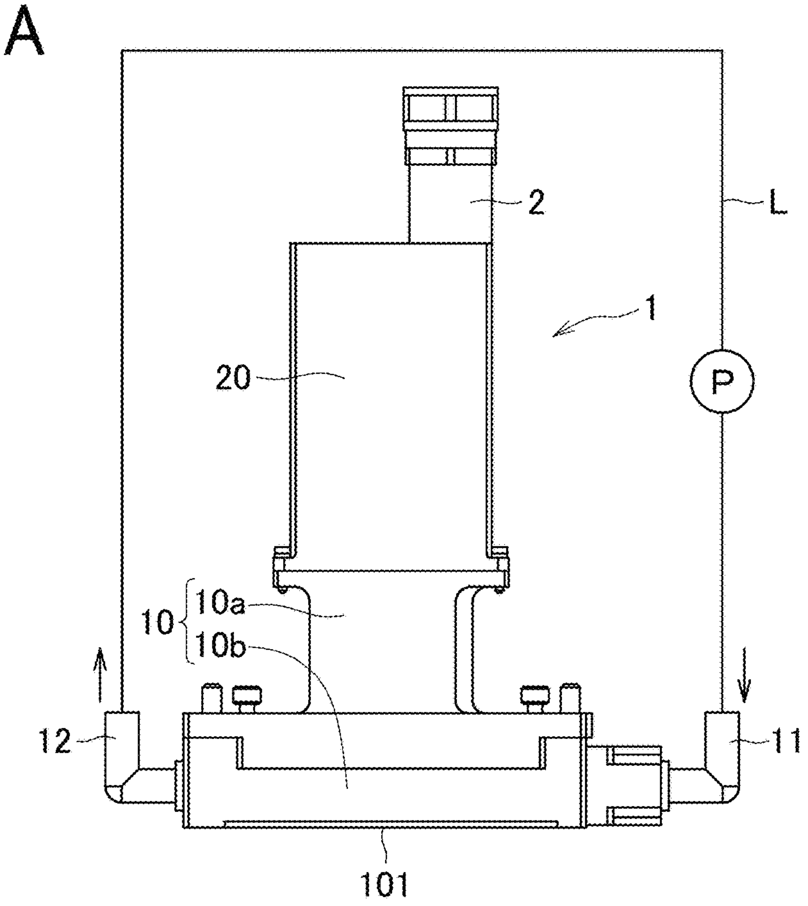
FIG. 1A is a front view of a liquid discharge head according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Liquid Discharge Head

Figure 1B:
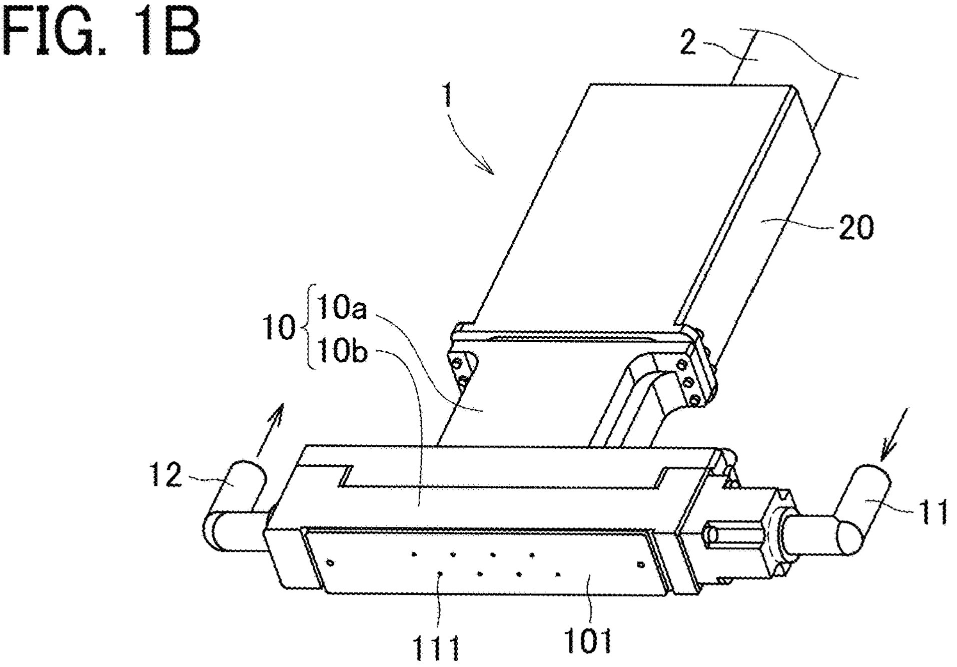
FIG. 1B is a perspective view of the liquid discharge head according to the present embodiment.

Hereinafter, the present embodiment will be described referring to the accompanying drawings. FIG. 1A is a front view of a liquid discharge head 1, and FIG. 1B is a perspective view of the liquid discharge head 1 as seen obliquely from below.

A housing 10 of the liquid discharge head 1 includes an upper housing 10*a* and a lower housing 10*b*. Onto the upper housing 10*a*, a cover 20 is attached, and inside the cover 20, an electric component is disposed. The cover 20 includes a connector 2 of the electric component at an upper end.

On a lower surface of the lower housing 10*b*, a nozzle plate 101 made of metal such as corrosion-resistant stainless steel (SUS) is disposed. A liquid is discharged from a fine nozzle 111 on the nozzle plate 101.

Figure 3:
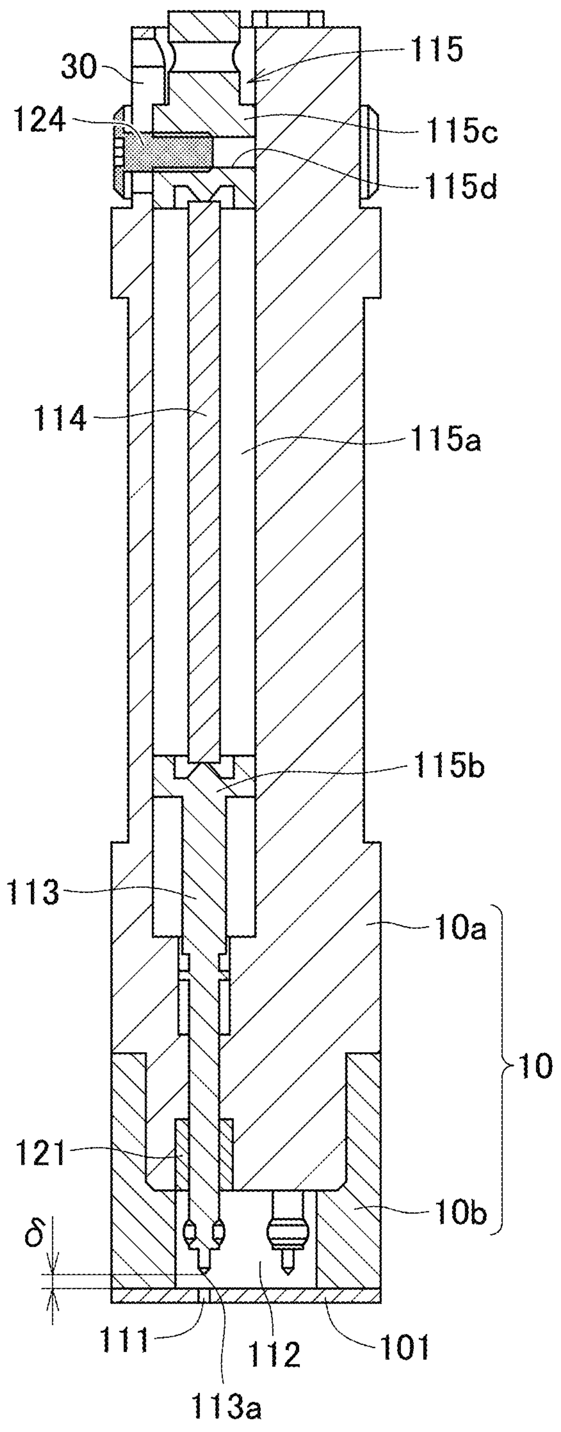
FIG. 3 is a cross-sectional view along a liquid channel of the liquid discharge head.

Inside the lower housing 10*b*, a liquid channel 112 is formed as illustrated in FIG. 3. One end of the liquid channel 112 is communicated with a supply port 11, and the other end thereof is communicated with a recovery port 12.

The supply port 11 and the recovery port 12 are coupled to each other via a circulation path L. and a pressurized liquid pressurized by a pump P of the circulation path L is supplied to the supply port 11. The pressurized liquid that is not discharged from the nozzle 111 is recovered from the recovery port 12 and then supplied to the supply port 11 again via the circulation path L and the pump P.

Figure 2A:
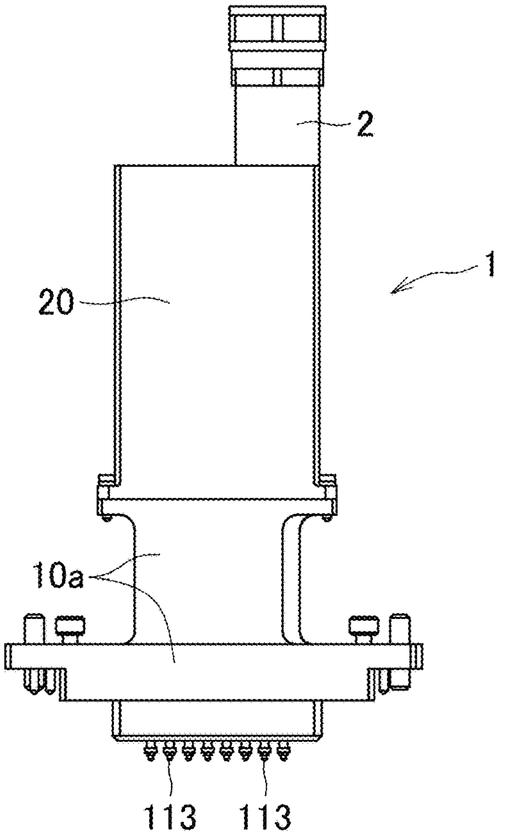
FIG. 2A is a front view of the liquid discharge head from which a lower housing is removed.
Figure 2B:
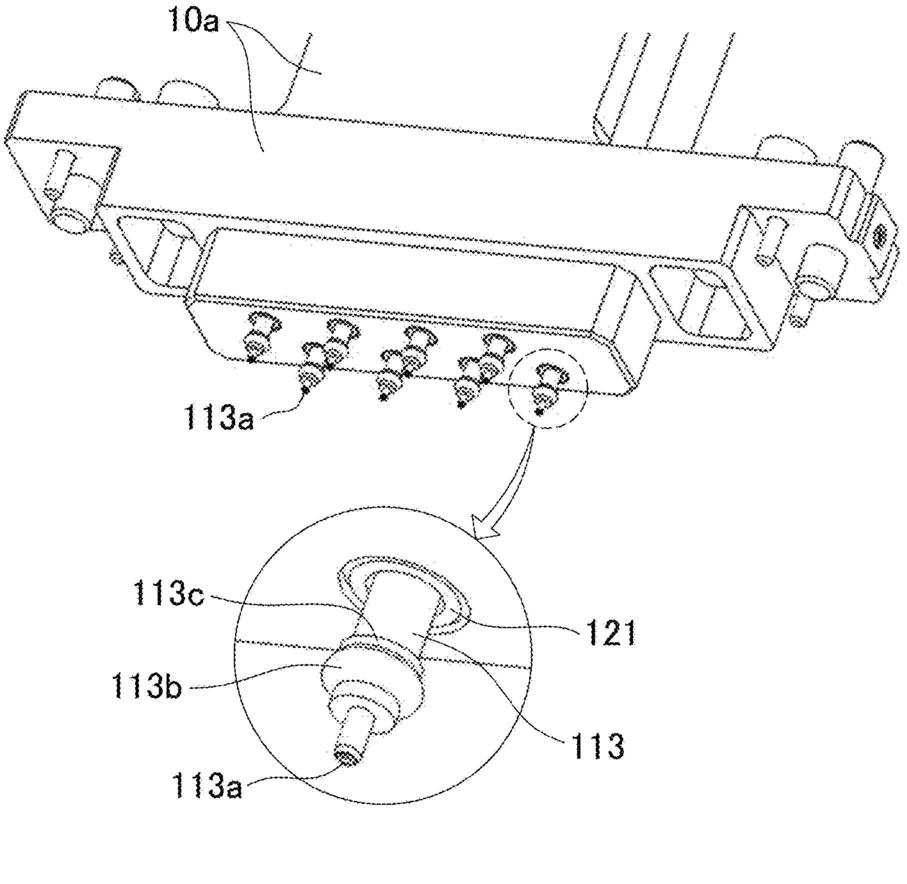
FIG. 2B is an enlarged perspective view of a lower end of the liquid discharge head.

When the lower housing 10*b* described above is removed, a leading end of a needle valve 113 as a shaft member is exposed from a bearing 121 on a lower surface of the upper housing 10*a* as illustrated in FIGS. 2A and 2B. The needle valve 113 is made of metal such as corrosion-resistant SUS, and is very thin with a diameter of 1 mm or less at a thin portion and a diameter of about 2 mm at a thick portion. The thin needle valve 113 is exposed from the bearing 121 of the upper housing 10*a* by a length of, for example, 1-20 mm.

At the leading end of the needle valve 113, a valve body 113*a* that opens and closes the nozzle 111 is disposed. Above the valve body 113*a*, an O-ring 113*b* having elasticity as a sealing member and a washer 113*c* for securing the O-ring 113*b* to the needle valve 113 are disposed.

Opening/Closing Drive of Needle Valve

As illustrated in FIG. 3, in the upper housing 10*a*, the needle valve 113 and a piezoelectric element 114 that drives the needle valve 113 are disposed. The piezoelectric element 114 is held in a central space 115*a* of a holding member 115.

On both upper and lower ends of the holding member 115, springs are formed, and the piezoelectric element 114 is held in a compressed state in an axial direction by the springs. A leading end 115*b* of the holding member 115 and a rear end of the needle valve 113 are coupled to each other with the piezoelectric element 114 and the needle valve 113 arranged coaxially. As a result, when the piezoelectric element 114 contracts in a longitudinal direction, the holding member 115 also contracts in the longitudinal direction, and may exert a biasing force in a direction to open the nozzle 111 to the needle valve 113.

The piezoelectric element 114 operates in a d31 mode when a voltage is applied by a voltage applier, and drives the needle valve 113 in the direction to open the nozzle 111. That is, when the voltage is applied to the piezoelectric element 114, the needle valve 113 is driven in the direction to open the nozzle 111.

Therefore, when no voltage is applied to the piezoelectric element 114, the needle valve 113 closes the nozzle 111. Therefore, even when the pressurized liquid is supplied to the liquid channel 112, the liquid is not discharged from the nozzle 111.

When the voltage is applied to the piezoelectric element 114, the piezoelectric element 114 contracts and pulls the needle valve 113 via the holding member 115, so that the valve body 113*a* of the needle valve 113 is separated from the nozzle 111 to open the nozzle 111. As a result, the pressurized liquid supplied to the liquid channel 112 is discharged as liquid from the nozzle 111.

The piezoelectric element 114 may also be operated in a d33 mode in which this is extended in a direction to close the needle valve 113 when a voltage is applied. When the piezoelectric element operates in the d33 mode, the valve body 113*a* of the needle valve 113 is pressed against the nozzle 111 side to close the nozzle 111 in a state in which the voltage is applied.

When the liquid is discharged, the application of the voltage to the piezoelectric element 114 is stopped or the voltage is lowered, so that the valve body 113*a* of the needle valve 113 is moved in the direction to open to open the nozzle 111. The d33 mode of the piezoelectric element 114 has high responsiveness and a large displacement amount. Therefore, the d33 mode is suitable when it is desired to enhance responsiveness of the opening/closing operation of the needle valve 113 and reduce variation in speed and amount of the liquid discharged from the nozzle 111.

Vertical Movement of Needle Valve

The holding member 115 is disposed in the upper housing 10*a* such that a position thereof may be adjusted in the vertical direction in FIG. 3. A rear end 115*c* of the holding member 115 may be positioned and secured to the upper housing 10*a* with a securing screw 124. In the rear end 115*c* of the holding member 115, a female screw hole 115*d* is formed in a direction perpendicular to the axial direction, and into the female screw hole 115*d*, a leading end of the securing screw 124 is screwed.

In an upper end of the upper housing 10*a*, a long hole 30 in the axial direction is formed as illustrated in FIG. 3, and the securing screw 124 is inserted into the long hole 30. When the securing screw 124 is loosened, the holding member 115 may move vertically.

In a state in FIG. 3, the securing screw 124 is fastened to be secured to the long hole 30 at a position at which a predetermined gap S is formed between the valve body 113*a* and the nozzle 111. In this state, the liquid discharge head 1 is delivered as a product.

Liquid Discharge Head

Figure 4A:
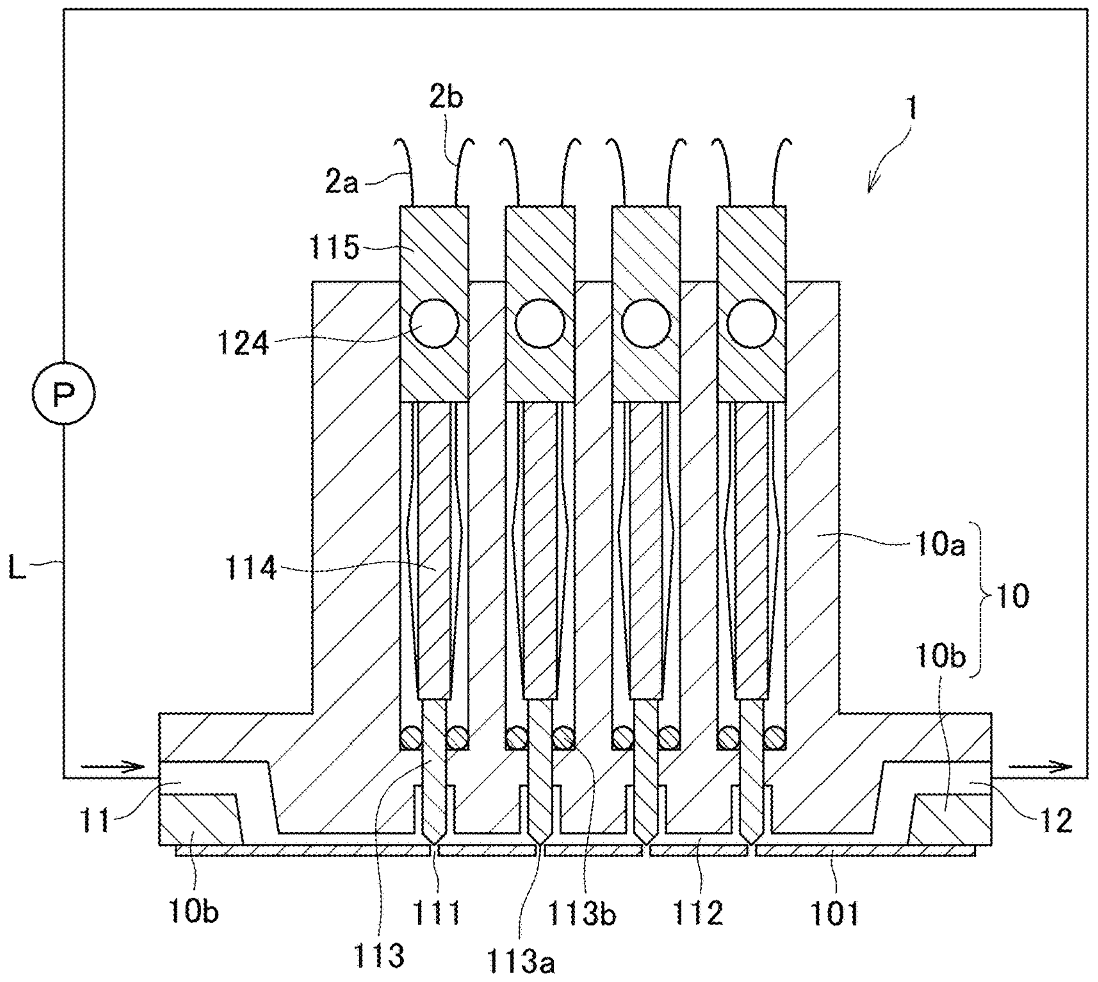
FIG. 4A is a cross-sectional view of the liquid discharge head taken along the liquid channel.
Figure 4B:
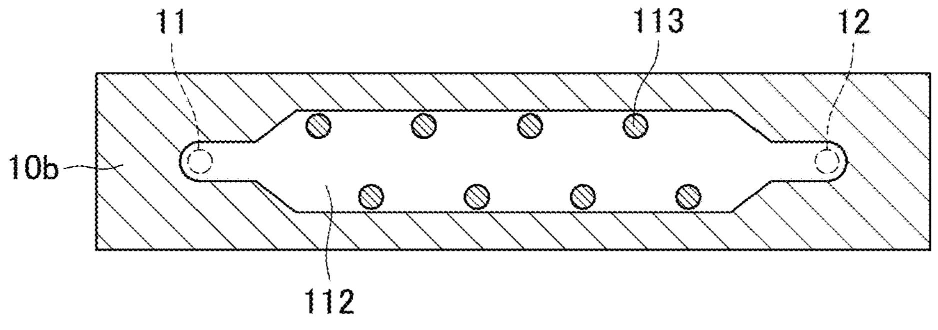
FIG. 4B is a plan view of a nozzle plate.

As illustrated in FIGS. 1B and 4A and 4B, two arrays of nozzles 111 are formed on the nozzle plate 101 along the liquid channel 112 from the supply port 11 toward the recovery port 12. Each array includes four nozzles 111, and the nozzles 111 are each opened and closed by the valve body 113*a* at the leading end of the needle valve 113. In FIG. 4A, lead wires of the connector 2 are represented by reference numerals 2*a* and 2*b*.

Conventionally, reinforcement between the arrays of the nozzles 111 on the nozzle plate 101 is not particularly considered. When the nozzles 111 are disposed in two arrays, a width or a volume of the liquid channel 112 increases, and a pressure receiving area of the nozzle plate 101 increases accordingly. Then, there is a disadvantage that an excessive peeling force acts on a bonding portion of a peripheral edge of the nozzle plate 101 to the lower housing 10*b*, and peeling and liquid leakage easily occur at the bonding portion.

First Embodiment of Coupling Portion

Figure 5A:
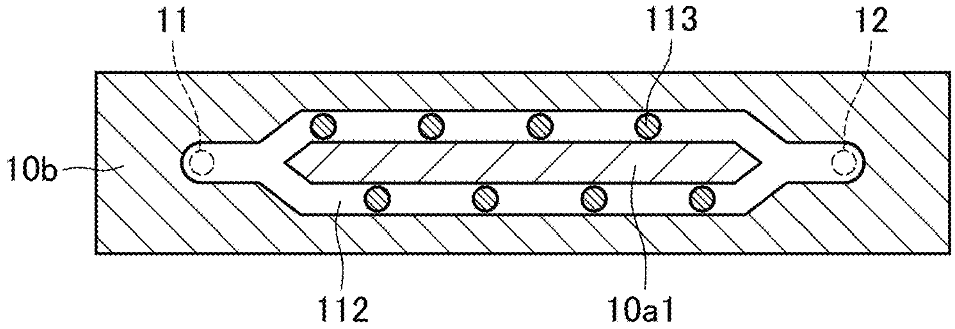
FIG. 5A is a plan view of the nozzle plate of the liquid discharge head according to a first embodiment.
Figure 5B:
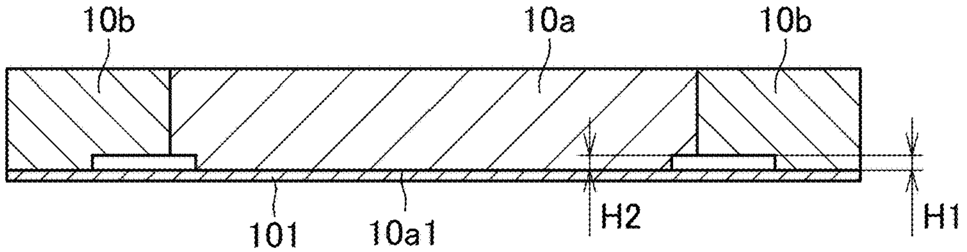
FIG. 5B is a cross-sectional view thereof.

Therefore, in the present embodiment, as illustrated in FIG. 5B, an inner region of a peripheral edge of a nozzle plate 101 and a housing 10*a* are coupled to each other with a coupling portion 10*a*1 crossing a channel 112 in a vertical direction. That is, the coupling portion 10*a*1 is formed along the liquid channel 112 (in parallel to a nozzle array) between two arrays of nozzles 111. The nozzle plate 101 has multiple nozzle arrays each having the multiple nozzles 111 arrayed in one direction (lateral direction in FIG. 1B) along the liquid channel 112.

The coupling portion 10*a*1 may be formed together with the upper housing 10*a* as a single body on a lower surface of the upper housing 10*a* facing the liquid channel 112. Then, a lower end face of the coupling portion 10*a*1 is bonded to an upper surface of the nozzle plate 101 using a thermosetting resin or the like. A length and a width of the coupling portion 10*a*1 may be optionally determined.

The nozzle plate 101 and the upper housing 10*a* may be formed of a material having corrosion resistance to a high-pressure liquid and having sufficient strength. The material of the nozzle plate 101 and the upper housing 10*a* is not particularly limited, and may be appropriately selected according to a purpose.

As the material of the nozzle plate 101 and the upper housing 10*a*, for example, stainless steel, Al, Bi, Cr, InSn, ITO, Nb, $Nb_2O_5$, NiCr, Si, $SiO_2$, Sn, $Ta_2O$, Ti, W, ZAO ($ZnO+Al_2O_3$), Zn, or the like may be selected. The above materials may be used alone, or two or more of the materials may be used in combination. Among the materials, stainless steel is preferable from the viewpoint of rust preventiveness.

In a case where the nozzle plate 101 and the upper housing 10*a* are coupled to each other via the coupling portion 10*a*1 as described above, if a difference in linear expansion coefficient between the nozzle plate 101 and the upper housing 10*a* is large, deformation might occur at a lower end bonding portion of the coupling portion 10*a*1. When such deformation occurs, flatness of the nozzle plate 101 is adversely affected, and liquid discharge accuracy (drawing accuracy) from the nozzle 111 is deteriorated.

Therefore, it is desirable that the nozzle plate 101 and the upper housing 10*a* are made of the same material. In a case of the same material, a thermal shrinkage amount when the thermosetting resin is cooled and cured at the lower end bonding portion of the coupling portion 10*a*1 is the same between the nozzle plate 101 and the coupling portion 10*a*1, and the flatness of the nozzle plate 101 may be maintained with high accuracy, and bonding strength may also be enhanced. This makes it possible to suppress variation in speed and volume of the liquid for each nozzle 111.

In the present embodiment, the nozzle plate 101 and the upper housing 10*a* are made of stainless steel (SUS 304). In place of the coupling portion 10*a*1 of the upper housing 10*a*, a similar coupling portion may be formed together with the nozzle plate 101 on the upper surface of the nozzle plate 101, and an upper end of the coupling portion may be bonded to the lower surface of the upper housing 10*a* with the thermosetting resin.

As illustrated in FIG. 5B, a height H1 of an outer periphery of the liquid channel 112 and a vertical height H2 of the coupling portion 10*a*1 may be set to be the same. As a result, the lower end face of the coupling portion 10*a*1 and a lower surface of the outer periphery of the liquid channel 112 may be flush with each other, and the upper surface of the nozzle plate 101 may be bonded thereto without any gap without deformation.

The coupling portion 10*a*1 in FIGS. 5A and 5B is continuously formed linearly along the liquid channel 112 (in parallel to the nozzle array). Although the length and width of the coupling portion 10*a*1 may be optionally set, it is preferable to form the same as long and wide as possible without hindering a flow of the liquid channel 112. Accordingly, a bonding area between the nozzle plate 101 and the upper housing 10*a* may be increased.

That is, the coupling portion 10*a*1 may improve a coupling force between the nozzle plate 101 and the upper housing 10*a* (pressure resistance of the nozzle plate 101). Since the coupling force is proportional to a cross-sectional area of the coupling portion 10*a*1, it is advantageous to form the coupling portion 10*a*1 as long and wide as possible along the liquid channel 112 as illustrated in FIG. 5A.

In this manner, the coupling portion 10*a*1 supports a part of the liquid pressure acting on the nozzle plate 101, so that it is possible to reduce the peeling force by the liquid pressure acting on the peripheral edge bonding portion of the nozzle plate 101 and prevent peeling and liquid leakage at the bonding portion. Since the coupling portion 10*a*1 may improve the pressure resistance of the nozzle plate 101, the flatness of the nozzle plate 101 may be maintained with high accuracy, and the bonding strength may also be enhanced. This makes it possible to suppress variation in speed and volume of the liquid for each nozzle 111.

The upper housing 10*a* and the lower housing 10*b* may be formed together to form a single housing 10. The coupling portion 10*a*1 may be formed together with the housing 10 as a single body.

Second Embodiment of Coupling Portion

Figure 6A:
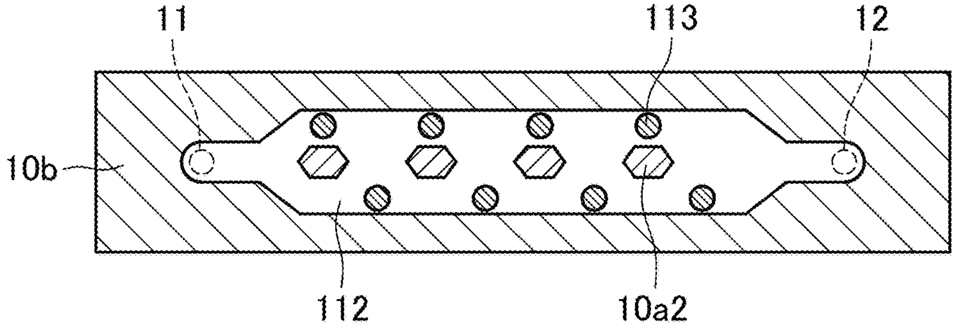
FIG. 6A is a plan view of the nozzle plate of the liquid discharge head according to a second embodiment.
Figure 6B:
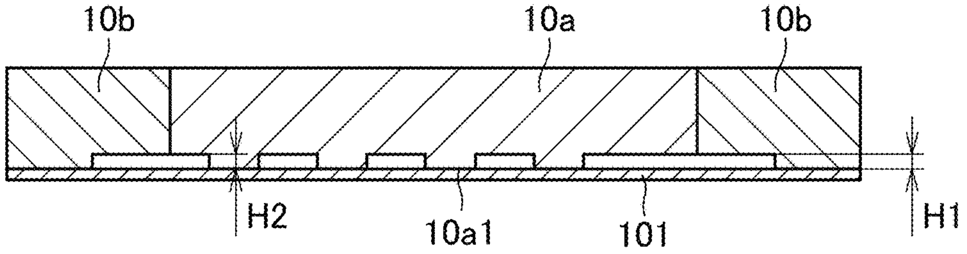
FIG. 6B is a cross-sectional view thereof.

In FIGS. 6A and 6B, multiple (four in the illustrated example) coupling portions 10*a*2 is formed between two arrays of nozzles 111 at equal intervals (in parallel to the nozzle array) along a channel 112. A length and a width of each of the multiple coupling portions 10*a*2 may be optionally determined.

A total cross-sectional area of the coupling portion 10*a*2 in FIG. 6A is slightly smaller than that of the coupling portion 10*a*1 in FIGS. 5A and 5B, but a large volume of the liquid channel 112 may be secured on the contrary. Therefore, there is a margin in a supply amount of high-pressure fluid to each nozzle 111. The coupling portion 10*a*2 may prevent peeling and liquid leakage at a bonding portion of a nozzle plate 101, and may suppress variation in speed and volume of liquid for each nozzle 111.

In the embodiment in FIGS. 6A and 6B also, as illustrated in FIG. 6B, a height H1 of an outer periphery of the liquid channel 112 and a vertical height H2 of the coupling portion 10*a*2 may be set to be the same. As a result, a lower end face of the coupling portion 10*a*2 and a lower surface of the outer periphery of the liquid channel 112 may be flush with each other, and an upper surface of the nozzle plate 101 may be bonded thereto without any gap without deformation.

Variation of Coupling Portion

Figure 7A:
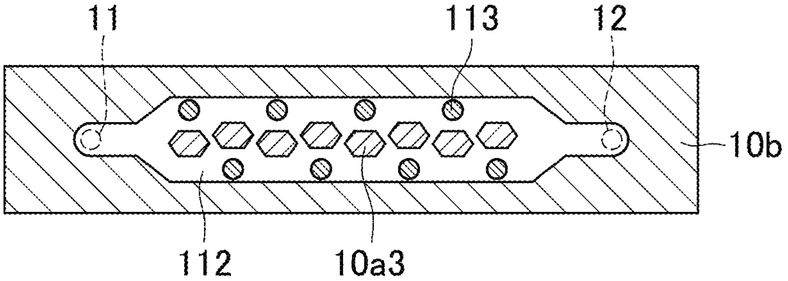
FIGS. 7A to 7F are plan views of a variation of a liquid discharge head.

FIGS. 7A to 7F illustrate other variations of the coupling portion described above. In FIG. 7A, multiple (eight in the illustrated example) coupling portions 10*a*3 is formed in a staggered shape along a channel 112 (in parallel to a nozzle array) between two arrays of nozzles 111. It is possible to bring the coupling portion 10*a*3 closer to a space between the nozzles 111 of each array to enhance pressure resistance of a nozzle plate 101.

Figure 7B:
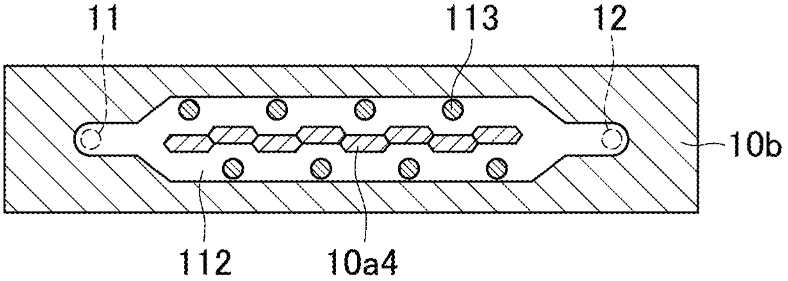

In FIG. 7B, a zigzag-shaped (or meandering) coupling portion 10*a*4 is formed between the two arrays of nozzles 111. In this variation also, since the coupling portion 10*a*4 may be brought closer to the space between the nozzles 111 of each array, the pressure resistance of the nozzle plate 101 may be enhanced.

Figure 7C:
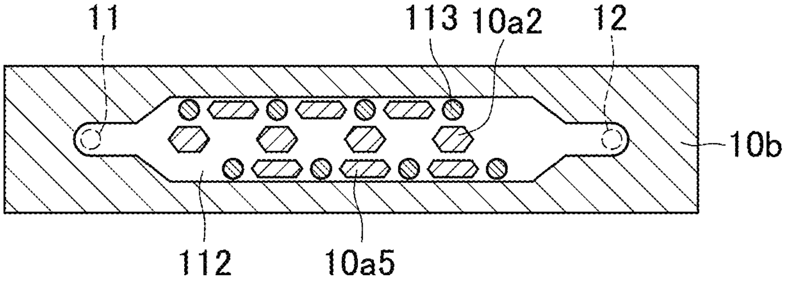

In FIG. 7C, multiple (four in the illustrated example) coupling portions 10*a*2 is formed at equal intervals between the two arrays of the nozzles 111, and a coupling portion 10*a*5 is also formed in the space between the nozzles 111 of each array. In this variation, the coupling portion 10*a*5 is added to the embodiment in FIGS. 6A and 6B. It is possible to add the coupling portion 10*a*5 to further enhance the pressure resistance of the nozzle plate 101.

Figure 7D:
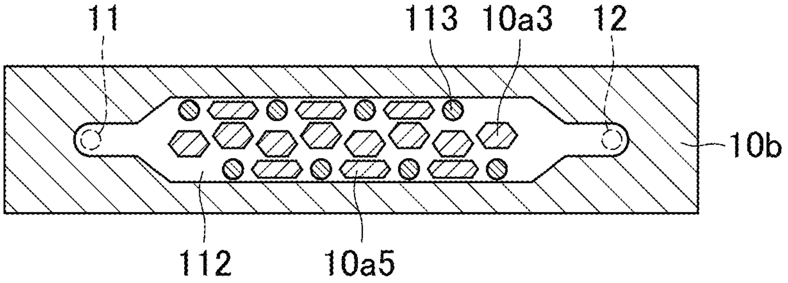

In FIG. 7D, multiple (eight in the illustrated example) coupling portions 10*a*3 is formed in a staggered shape along the liquid channel 112 (in parallel to the nozzle array) between the two arrays of the nozzles 111, and the coupling portion 10*a*5 is also formed in the space between the nozzles 111 of each array. In this variation, the coupling portion 10*a*5 is added to the variation in FIG. 7A. It is possible to add the coupling portion 10*a*5 to further enhance the pressure resistance of the nozzle plate 101.

Figure 7E:
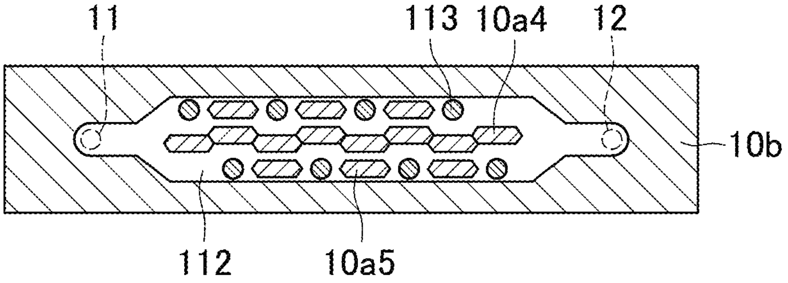

In FIG. 7E, the zigzag-shaped (or meandering) coupling portion 10*a*4 is formed between the two arrays of the nozzles 111, and the coupling portion 10*a*5 is also formed in the space between the nozzles 111 of each array. In this variation, the coupling portion 10*a*5 is added to the variation in FIG. 7B. It is possible to add the coupling portion 10*a*5 to further enhance the pressure resistance of the nozzle plate 101.

Figure 7F:
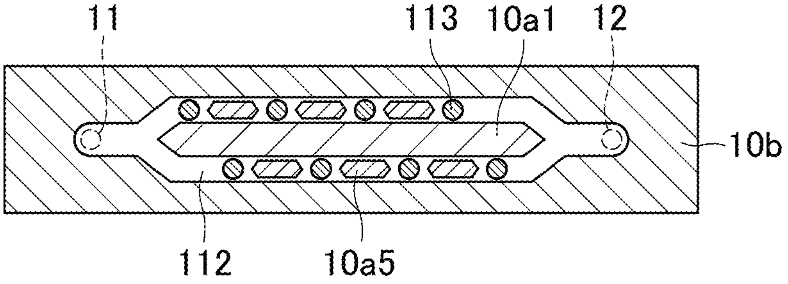

In FIG. 7F, the coupling portion 10*a*1 is continuously formed linearly along the liquid channel 112 (in parallel to the nozzle array) between the two arrays of the nozzles 111, and the coupling portion 10*a*5 is also formed in the space between the nozzles 111 of each array. It is possible to add the coupling portion 10*a*5 to further enhance the pressure resistance of the nozzle plate 101.

Formation of Alloy Film

Figure 8:
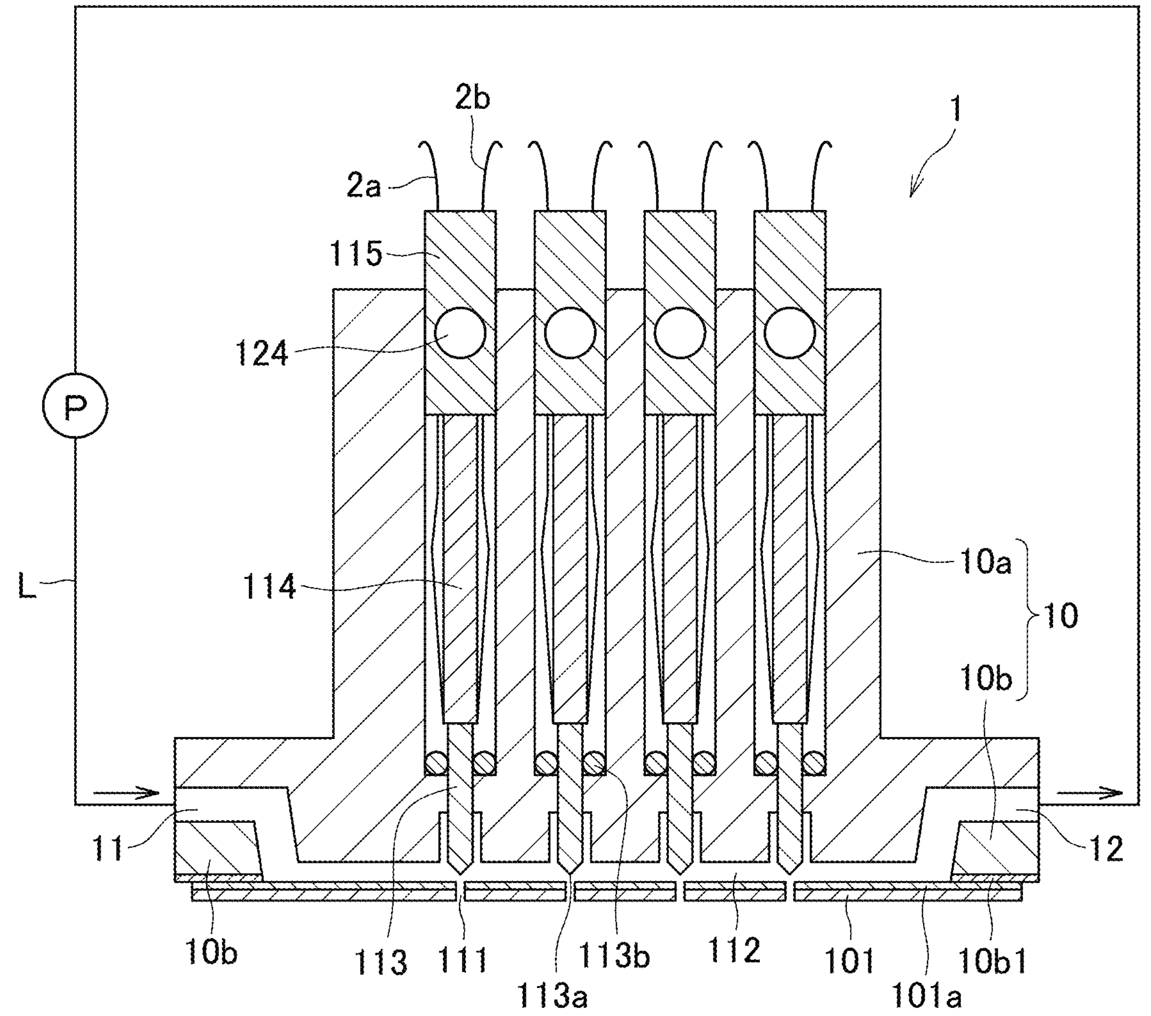
FIG. 8 is a cross-sectional view taken along a liquid channel of the variation of the liquid discharge head.

In FIG. 8, on the lower surface of the lower housing 10*b* and the upper surface of the nozzle plate 101, alloy films 10*b*1 and 101*a* are formed, respectively. The alloy films 10*b*1 and 101*a* may enhance the bonding strength between the lower housing **10*b* and the nozzle plate 101, and may prevent peeling and liquid leakage at the bonding portion. That is, it is possible to form, for example, zirconium or the like on the lower surface of the lower housing 10*b* and the upper surface of the nozzle plate 101 as the alloy films 10*b*1 and 101*a***, respectively, to further enhance the adhesion strength with the adhesive, and improve the corrosion resistance (ink resistance) to the high-pressure liquid.

Liquid Discharge Apparatus

Figure 9:
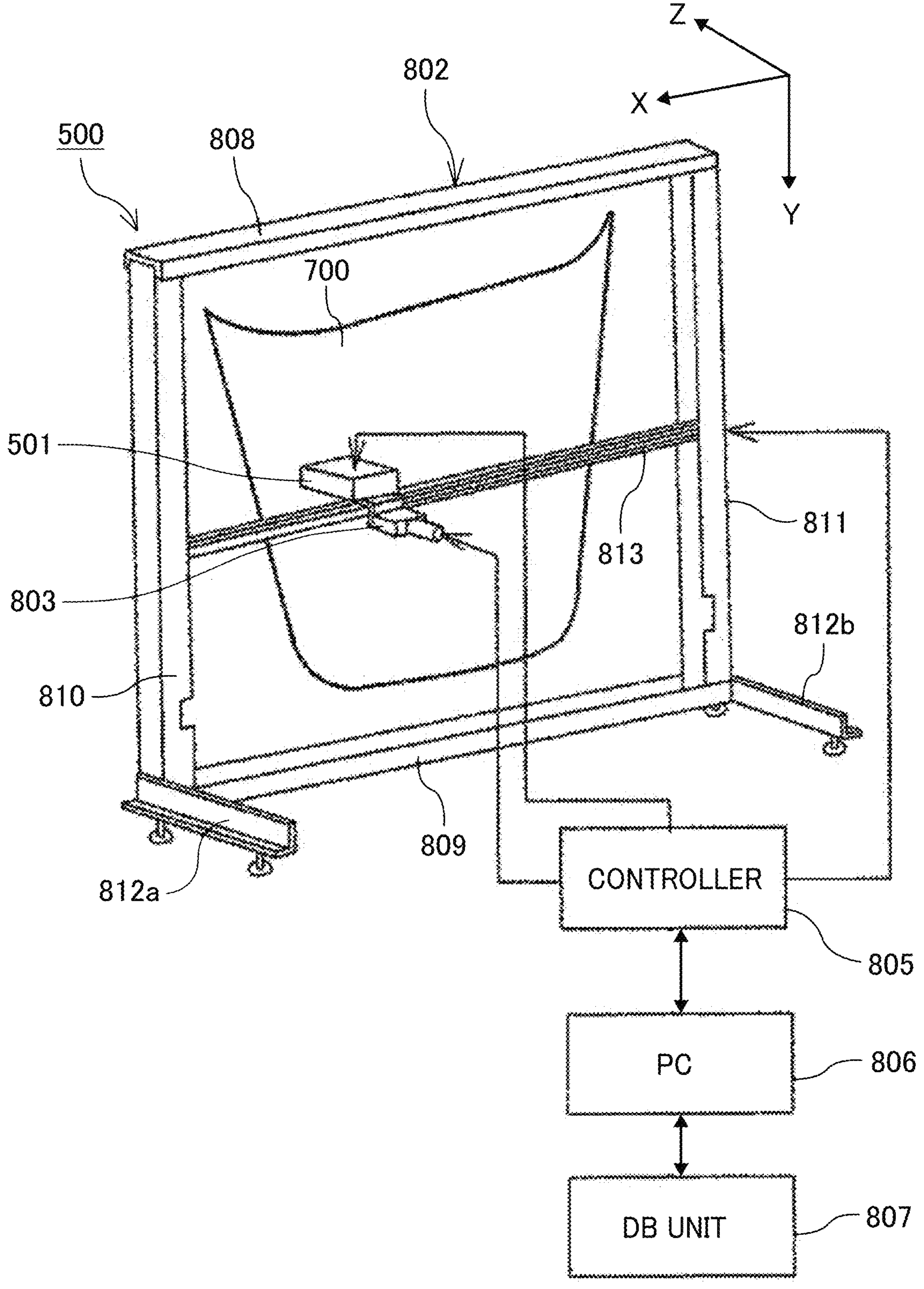
FIG. 9 is a perspective view of a liquid discharge apparatus.
Figure 10:
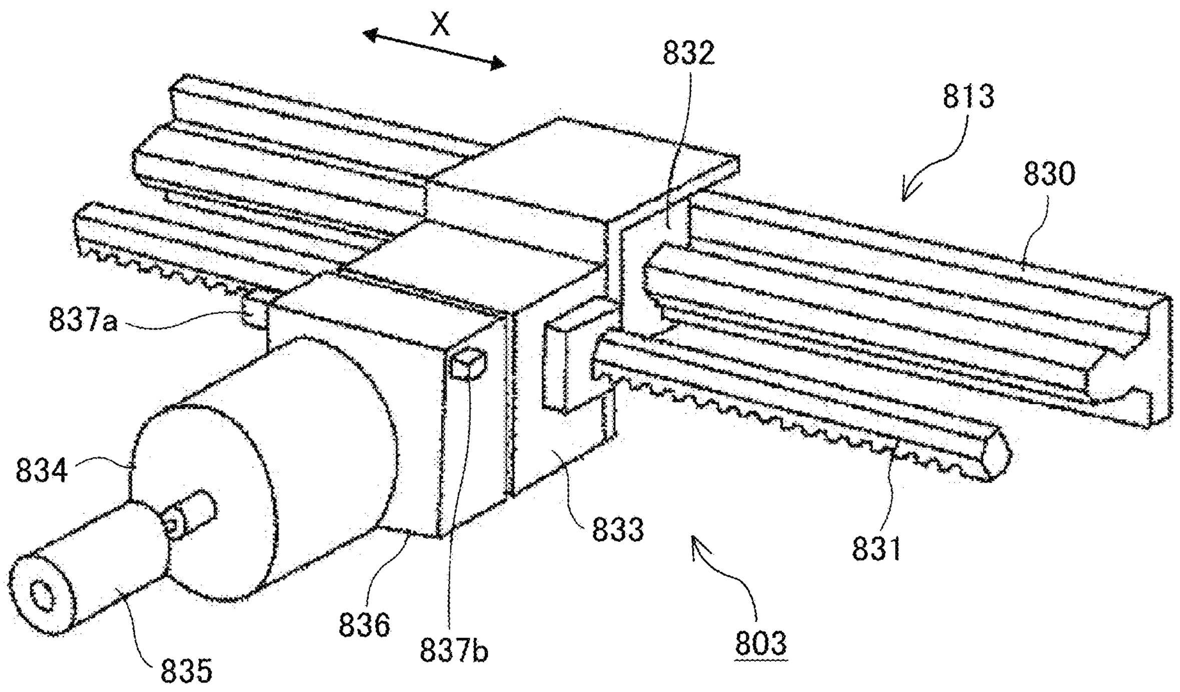
FIG. 10 is a perspective view of a driver of the liquid discharge apparatus.

Next, an embodiment of a liquid discharge apparatus 500 using the liquid discharge head 1 in FIGS. 1A and 1B will be described referring to FIGS. 9 and 10. FIG. 9 is a perspective view of the liquid discharge apparatus 500, and FIG. 10 is a perspective view of a driver of the liquid discharge apparatus 500.

The liquid discharge apparatus 500 includes a movable frame 802 installed to face a printing object 700 having a curved surface such as a hood of a vehicle. The frame 802 includes a left frame 810, a right frame 811, and a movable part 813. The movable part 813 is attached to the left frame 810 and the right frame 811 so that the movable part 813 is bridged between the left frame 810 and the right frame 811. The movable part 813 is vertically movable in the Y direction.

The movable part 813 includes a driver 803 incorporating a motor that is reciprocally movable in a horizontal direction (X-axis direction) on the movable part 813, and a liquid discharge unit 501 attached to the driver 803 to discharge a liquid toward the printing object 700.

This also includes a controller 805 that controls discharge of the liquid from the liquid discharge unit 501, reciprocation of the driver 803, and vertical movement of the movable part 813, and an information processing apparatus 806 such as a personal computer (PC) that issues a command to the controller 805. The information processing apparatus 806 is connected to a database unit (DB unit) 807 that records and stores information on the printing object 700 such as a shape and a size.

The frame 802 further includes an upper frame 808 and a lower frame 809 in addition to the left frame 810 and the right frame 811 that form a vertical and horizontal outline of the frame 802. The upper frame 808, the lower frame 809, the left frame 810, and the right frame 811 are formed of metal pipes or the like. The frame 802 further includes a left leg **812*a* and a right leg 812*b* attached to both ends of the lower frame 809 to make the frame 802 to be free-standing. The left leg 812*a* and the right leg 812*b* are perpendicularly and horizontally attached to both ends of the lower frame 809. The movable part 813 bridged between the left frame 810 and the right frame 811 is vertically movable while supporting the driver 803**.

The printing object 700 is disposed perpendicular to a liquid discharge direction (Z-axis direction), in other words, so as to face a plane formed by the upper frame 808, the lower frame 809, the right frame 811, and the left frame 810 of the frame 802. In such a case, in order to locate the printing object 700 at a predetermined position at which printing is to be performed, for example, the back side of a printing area of the printing object 700 can be sucked and held by a chuck attached to a leading end of an arm of an articulated arm robot. Using the articulated arm robot allows the printing object 700 to be accurately located at the printing position and the posture of the printing object 700 to be accurately changed.

As illustrated in FIG. 9, the driver 803 is reciprocally movable in the horizontal direction (X-axis direction) along the movable part 813 as a guide rail. The movable part 813 includes a rail 830 horizontally disposed so as to bridge over the left and right frames 810 and 811 of the frame 802, a rack gear 831 disposed so as to be parallel to the rail 830, a linear guide 832 externally fitted to a part of the rail 830 to move while sliding, a pinion gear unit 833 coupled to the linear guide 832 and meshing with the rack gear 831, a motor 834 with a decelerator 836 that rotationally drives the pinion gear unit 833, and a rotary encoder 835 for print point position detection.

The motor 834 is driven (forward rotation or reverse rotation) to move the liquid discharge unit 501 rightward or leftward along the movable part 813. The driver 803 serves as a drive mechanism of the liquid discharge unit 501 in the X-axis direction. The decelerator 836 includes limit switches **837*a* and 837*b* attached to both sides of a housing of the decelerator 836**.

The liquid discharge unit 501 includes, for example, multiple liquid discharge heads 1 that discharges liquids of respective colors of black, cyan, magenta, yellow, and white, or the liquid discharge head 1 including multiple nozzle arrays. The liquid of each color is pressurized and supplied from a liquid tank to each liquid discharge head 1 or each nozzle array of the liquid discharge head 1 of the liquid discharge unit 501.

In the liquid discharge apparatus 500, the movable part 813 is moved in the Y direction, and the liquid discharge unit 501 is moved in the X-axis direction to print an image on the printing object 700. The "liquid discharge apparatus" described above is not limited to an apparatus that visualizes a meaningful image such as a character or a figure by the discharged liquid. For example, an apparatus that forms a pattern having no meaning itself, a uniform coating film or the like, and an apparatus that forms a three-dimensional image are also included.

Although the present embodiment is described above, the present embodiment is not limited to the above-described embodiment, and various modifications can be made on the basis of the technical idea recited in claims. For example, the nozzle plate 101 and the lower housing **10*b* can be bonded by a method other than the adhesive. For example, the nozzle plate 101 and the lower housing 10*b* may be bonded by diffusion bonding. The nozzles 111 are not necessarily disposed in multiple nozzle arrays. The present embodiment can be applied when the liquid channel is wide even if the nozzles are disposed in a single array. The liquid channel 112 is not necessarily coupled to the circulation path L. It is applicable to a liquid discharge head of a type without the recovery port 12 in which the supplied liquid is entirely discharged from the nozzle 111. The piezoelectric element 114 can be replaced with another drive body that extends and contracts in the longitudinal direction. For example, a piston that extends and contracts in the longitudinal direction by an electromagnetic solenoid can be used in place of the piezoelectric element 114**.

[Aspect 1]

A liquid discharge head includes: a nozzle plate having multiple nozzles from each of which a liquid is to be discharged; a housing supporting a peripheral edge of the nozzle plate; a liquid channel between the nozzle plate and the housing; and a coupling portion coupling an inner region of the peripheral edge of the nozzle plate and the housing.

[Aspect 2]

In the liquid discharge head according to aspect 1, the nozzle plate has multiple nozzle arrays each having the multiple nozzles arrayed in one direction, and the coupling portion is between the multiple nozzle arrays.

[Aspect 3]

In the liquid discharge head according to aspect 2, the coupling portion is linearly and continuously formed in parallel to the one direction.

[Aspect 4]

In the liquid discharge head according to aspect 2, further includes multiple coupling portions including the coupling portion, and the multiple coupling portions is arrayed in the one direction between the multiple nozzle arrays.

[Aspect 5]

In the liquid discharge head according to aspect 4, the multiple coupling portions is arrayed at equal intervals in the one direction between the multiple nozzle arrays.

[Aspect 6]

In the liquid discharge head according to aspect 2, the coupling portion is between the multiple nozzles of each of the multiple nozzle arrays in the one direction.

[Aspect 7]

In the liquid discharge head according to aspect 4, the multiple coupling portions are staggered in the one direction.

[Aspect 8]

In the liquid discharge head according to aspect 1, the coupling portion is formed together with the housing as a single body.

[Aspect 9]

In the liquid discharge head according to aspect 1, the nozzle plate and the housing are made of a same material, and the coupling portion is formed together with the housing as a single body.

[Aspect 10]

In the liquid discharge head according to aspect 1, the nozzle plate and the housing are made of a same material, and the coupling portion is formed together with the nozzle plate as a single body.

[Aspect 11]

In the liquid discharge head according to aspect 1, an alloy film is formed on a surface of each of the housing and the nozzle plate.

[Aspect 12]

A liquid discharge apparatus includes the liquid discharge head according to aspect 1.

According to the present embodiment, it is possible to prevent peeling and liquid leakage at the bonding portion of the nozzle plate to the housing.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:
- a nozzle plate having multiple nozzles from each of which a liquid is to be discharged;
- a housing supporting a peripheral edge of the nozzle plate;
- a liquid channel between the nozzle plate and the housing; and
- a coupling portion coupling an inner region of the peripheral edge of the nozzle plate and the housing.

2. The liquid discharge head according to claim 1,
- wherein the nozzle plate has multiple nozzle arrays each having the multiple nozzles arrayed in one direction, and
- the coupling portion is between the multiple nozzle arrays.

3. The liquid discharge head according to claim 2,
- wherein the coupling portion is linearly and continuously formed in parallel to the one direction.

4. The liquid discharge head according to claim 2, further comprising multiple coupling portions including the coupling portion,
- wherein the multiple coupling portions is arrayed in the one direction between the multiple nozzle arrays.

5. The liquid discharge head according to claim 4,
- wherein the multiple coupling portions is arrayed at equal intervals in the one direction between the multiple nozzle arrays.

6. The liquid discharge head according to claim 4,
- wherein the multiple coupling portions are staggered in the one direction.

7. The liquid discharge head according to claim 2,
- wherein the coupling portion is between the multiple nozzles of each of the multiple nozzle arrays in the one direction.

8. The liquid discharge head according to claim 1,
- wherein the coupling portion is formed together with the housing as a single body.

9. The liquid discharge head according to claim 1,
- wherein the nozzle plate and the housing are made of a same material, and
- the coupling portion is formed together with the housing as a single body.

10. The liquid discharge head according to claim 1,
- wherein the nozzle plate and the housing are made of a same material, and
- the coupling portion is formed together with the nozzle plate as a single body.

11. The liquid discharge head according to claim 1,
- wherein an alloy film is formed on a surface of each of the housing and the nozzle plate.

12. A liquid discharge apparatus comprising the liquid discharge head according to claim 1.

* * * * *